United States Patent
Watkins et al.

[11] Patent Number: 6,158,311
[45] Date of Patent: Dec. 12, 2000

[54] MACHINE TOOL WITH TWO ECCENTRIC SPINDLES FOR MULTIPLE DIAMETER BORING

[75] Inventors: Adrian Howard Watkins, Nr Rugby; Colin Wyatt, Rugby, both of United Kingdom

[73] Assignee: Federal-Mogul Technology Limited, Rugby, United Kingdom

[21] Appl. No.: 09/214,461

[22] PCT Filed: Jul. 4, 1997

[86] PCT No.: PCT/GB97/01827

§ 371 Date: Jan. 5, 1999

§ 102(e) Date: Jan. 5, 1999

[87] PCT Pub. No.: WO98/02267

PCT Pub. Date: Jan. 22, 1998

[30] Foreign Application Priority Data

Jul. 11, 1996 [GB] United Kingdom .................... 9614601

[51] Int. Cl.[7] ....................................................... B23B 3/26
[52] U.S. Cl. .................................. 82/1.4; 82/100; 82/118; 82/158
[58] Field of Search ............................... 82/1.4, 1.2, 1.3, 82/82, 100, 118, 158, 905

[56] References Cited

U.S. PATENT DOCUMENTS

| 4,569,115 | 2/1986 | Unno et al. ................................ 29/558 |
|---|---|---|
| 4,602,539 | 7/1986 | Tsukiji ....................................... 82/1.2 |
| 4,648,295 | 3/1987 | Ley et al. ................................ 82/1.3 X |
| 4,742,738 | 5/1988 | Strand .................................... 82/1.4 X |
| 4,790,221 | 12/1988 | Iwata et al. ............................ 82/1.2 X |
| 4,934,040 | 6/1990 | Turchan ................................... 29/566 |
| 5,150,518 | 9/1992 | Fuchs ..................................... 82/1.4 X |
| 5,159,862 | 11/1992 | Byrnes et al. ......................... 82/1.4 X |

*Primary Examiner*—Henry W. H. Tsai
*Attorney, Agent, or Firm*—Synnestvedt & Lechner LLP

[57] ABSTRACT

A machine tool comprises a support mounted for rotation about a machining axis, a first motor operable to rotate the support about the machining axis, a tool holder mounted on the support for rotation about a tool positioning axis which is parallel to and off-set from the machining axis, a second motor operable to rotate the tool holder about the tool positioning axis, and control means. For a constant diameter machining circle, the support and the tool holder are rotated about their respective axes at equal angular velocities so that they rotate as a unit. To adjust the diameter of the machining circle, one of the motors operates for a period at a different angular velocity to the other motor, thereby altering the position of the tool holder relative to the support about the tool positioning axis.

3 Claims, 2 Drawing Sheets

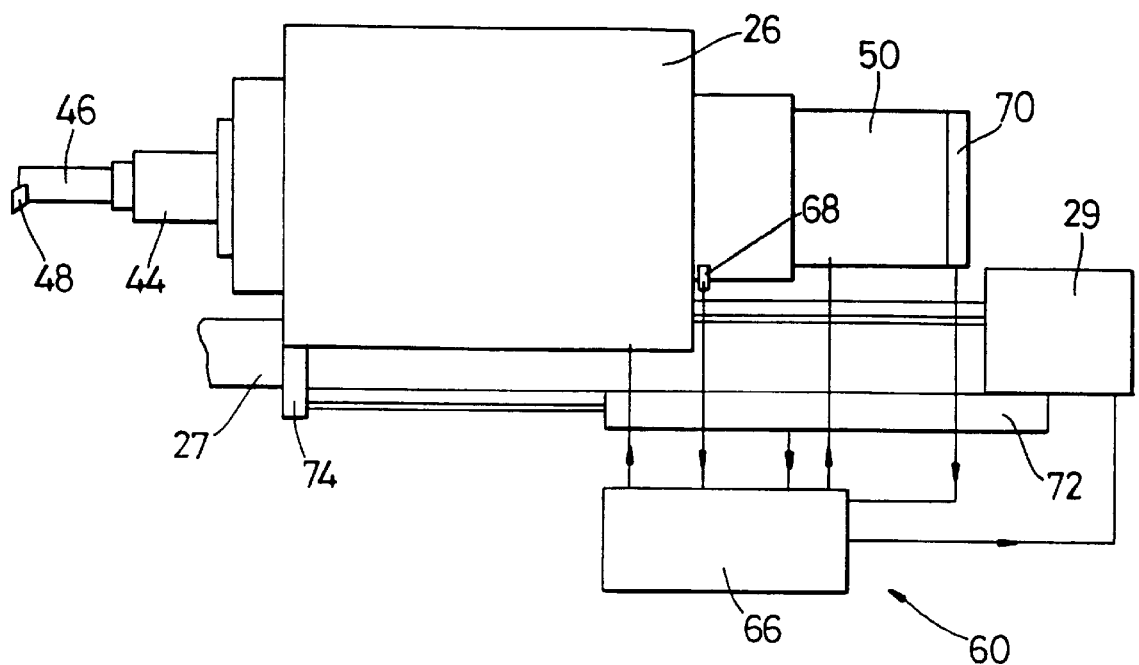
Fig. 2
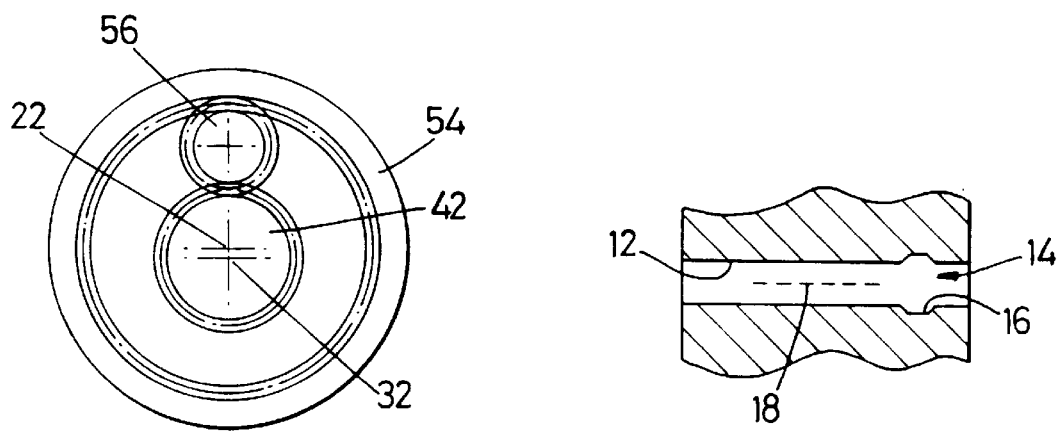
Fig. 3  Fig. 4

MACHINE TOOL WITH TWO ECCENTRIC SPINDLES FOR MULTIPLE DIAMETER BORING

FIELD OF THE INVENTION

This invention is concerned with a machine tool, in particular a machine tool suitable for use in machining the surface of a bore by moving a cutting tool around a machining circle.

BACKGROUND OF THE INVENTION

There are many occasions when it is necessary to machine the surface of a bore. Conventionally, where the bore has a constant diameter along its length, a cutting tool is fixedly mounted on a tool carrier and is moved along the bore while the carrier is rotated at a constant angular velocity about a machining axis which is coincident with the longitudinal axis of the bore. The cutting tool, thus, machines around a machining circle of constant diameter. This procedure has the disadvantage that it is not possible to make a fine adjustment of the diameter of the machining circle without remounting the tool on its carrier.

It is conventional, where the bore varies in diameter, ie is profiled, to vary the diameter of the machining circle, as the bore is machined. This is achieved by providing a transverse slideway on the tool carrier and mounting the tool on this slideway. A mechanism extends through the tool carrier, and a tool holder on which the tool carrier is mounted, to a thrust washer or the like which can be moved, eg by a ball screw, to move the tool inwardly or outwardly along the slideway so that the tool moves transversely relative to the tool carrier. This arrangement can also, in principle, be used for making fine adjustments when machining bores of constant diameter. However, not only is this arrangement relatively complex but it also has the disadvantage that the slideway may become clogged with swarf.

SUMMARY AND OBJECT OF THE INVENTION

It is an object of the present invention to provide a machine tool in which the diameter of the machining circle can be varied without re-mounting the cutting tool and without moving it transversely relative to its tool carrier.

The invention provides a machine tool suitable for use in machining the surface of a bore by moving a cutting tool around a machining circle which has an adjustable diameter, the machine tool comprising a support mounted for rotation about a machining axis, and a first motor operable to rotate the support about the machining axis, characterised in that the machine tool also comprises a tool holder mounted on the support for rotation about a tool positioning axis which is parallel to and off-set from the machining axis, the tool holder being adapted to receive a tool carrier on which a cutting tool is mounted, a second motor operable to rotate the tool holder about the tool positioning axis, and control means operable to control the speed of rotation of the first and the second motors according to a predetermined program so that, in order to maintain a constant diameter for the machining circle, the support and the tool holder are rotated about their respective axes at equal angular velocities so that the tool holder and the support rotate as a unit, and, in order to adjust the diameter of the machining circle, one of the motors operates for a period at a different angular velocity to the other motor, thereby altering the position of the tool holder relative to the support about the tool positioning axis and altering the distance of a cutting tool mounted on the tool holder from the machining axis.

In a machine tool according to the invention, the diameter of the machining circle can be adjusted without re-mounting the cutting tool and without moving it relative to the tool holder so that there is no danger of swarf causing clogging. The machine tool is also mechanically relatively simple. It is also relatively simple to change a cutting tool since a replacement tool carrier with a tool mounted thereon can be mounted on the tool holder without the complications associated with mounting a tool on a transverse slideway. Where said off-set is small, eg 0.1 mm, the machine tool can be used for machining bores of nominally constant diameter with the diameter of the machining circle being finely adjusted as machining proceeds, eg in response to a feedback of the diameter achieved. Where said off-set is larger, eg 2.5 mm, the machine tool can be used for machining profiled bores.

The positioning axis may be off-set from said machining axis by between 0.1 mm and 5 mm.

One advantageous mechanism for transferring drive from said second motor to said tool holder is to provide that said second motor drives a hollow cylindrical gear which is provided with internal teeth, the cylindrical gear driving an idler gear which is mounted for rotation on said support, and the idler gear driving a gear which is fixedly mounted on said tool holder.

In some cases, it is advantageous to provide that the machine tool also comprises locking means operable to lock the tool holder against rotation relative to the support about the tool positioning axis. Such a locking means may be provided by a latch. If no adjustment of the diameter of the machining circle is necessary for an extended time, the locking means can be operated.

There now follows a detailed description, to be read with reference to the accompanying drawings, of a machine tool which is illustrative of the invention.

BRIEF DESCRIPTION OF THE DRAWINGS

In the drawings:

FIG. 2 is a diagrammatic view, on an increased scale, of a gear arrangement of the illustrative machine tool;

FIG. 3 is a diagrammatic view, on a reduced scale, of control means of the illustrative machine tool; and FIG. 4 is a cross-sectional view taken through a profiled bore.

DETAILED DESCRIPTION OF THE INVENTION

Figure 1:
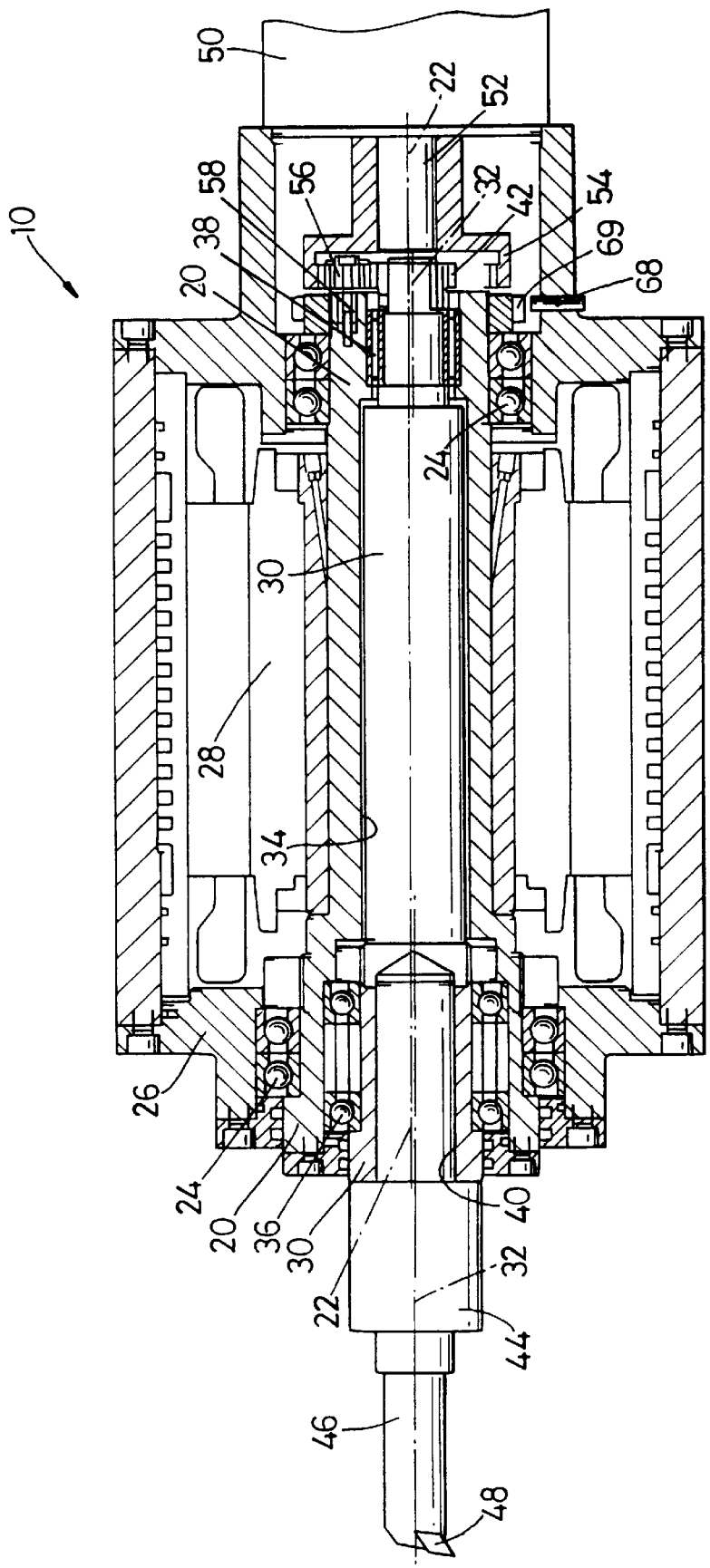
FIG. 1 is a verticle cross-sectional view taken through the illustrative machine tool.

The illustrative machine tool 10 is suitable for use in machining the surface of a profiled bore by moving a cutting tool around a machining circle which has an adjustable diameter. For example, the machine tool 10 can be used to machine the surface 12 of the bore 14 shown in FIG. 4. The bore 14 is a gudgeon pin-receiving bore of a piston of an internal combustion engine. The bore 14 is of constant diameter except that it has a cylindrical recess 16 therein to receive a gudgeon pin-retaining clip. Thus, the cutting tool used to machine the bore 14 must enter the recess 16 by moving further from the axis 18 of the bore 14 and must leave the recess 16 by moving nearer to the axis 18.

The machine tool 10 comprises a support 20 mounted for rotation about a machining axis 22 of the tool 10. The support 20 is generally cylindrical and is mounted on two pairs of ball races 24 which are mounted within a generally-cylindrical frame 26 of the tool 10. The frame 26 cannot rotate as it is mounted for linear movement only on a slideway 27 (FIG. 2) which runs parallel to the machining axis 22. The frame 26 and all parts mounted thereon can be moved in a controlled manner along the slideway by operation of linear moving means in the form of a ball-screw 29.

The machine tool 10 also comprises a first motor 28 which is operable to rotate the support 20 about the machining axis 22. The motor 28 is a stator motor and is fixedly mounted within the frame 26 so that it surrounds the support 20. The motor 28 operates to rotate the support 20 about the machining axis 22.

The machine tool 10 also comprises a tool holder 30 mounted on the support 20 for rotation about a tool positioning axis 32. The tool positioning axis 32 is parallel to the machining axis 22 and is off-set therefrom. In this case, the off-set is 2.5 mm. Speifically, the tool holder 30 is mounted in a longitudinal bore 34 through the support 20, the bore 34 being centred on the tool positioning axis 32. The bore 34 contains a pair of ball races 36 and a needle bearing 38 on which the tool holder 30 is mounted. The tool holder 30 is adapted to receive a tool carrier on which a cutting tool is mounted. To this end, the tool holder 30 has a blind bore 40 therein which is centred on the axis 32 and is formed in one end portion of the tool holder 30 and opens through an end surface thereof. At the other end of the tool holder 30, on a portion thereof which projects beyond the support 20, a gear 42 is fixedly mounted so that, when the gear 42 is rotated, it causes the tool holder 30 to rotate about the axis 32. The gear 42 has twenty-two external teeth.

The bore 40 in the tool holder 30 receives a tool carrier 44 which is fixed in the bore. A spindle 46 of the tool carrier 44 projects clear of the support 20 along the axis 32. This spindle 46 has a conventional cutting tool 48 of the type used for machining metal workpieces mounted thereon. In the operation of the machine tool 10, the tool 48 is rotated about the machining axis 22 and the circle traced by the cutting edge of the tool 48 is referred to as the machining circle.

The machine tool 10 also comprises a second motor 50 operable to rotate the tool holder 30 about the tool positioning axis 32. The motor 50 is fixedly mounted on the outside of the frame 26 beside the support 20 and has an output shaft 52 which is aligned with the machining axis 22. The motor 50 drives a hollow cylindrical gear 54 (see FIG. 3) which is provided with forty-seven internal teeth. The gear 54 is fixedly-mounted on the output shaft 52. The gear 54 is meshed with and drives an idler gear 56 which has fourteen external teeth and is mounted within the gear 54 for rotation about a stub axle 58 which is mounted on the support 20. The idler gear 56 is meshed with and drives the gear 42.

The machine tool 10 also comprises control means 60 shown diagrammatically in FIG. 2. The control means 60 controls the first motor 28 and the second motor 50. The control means 60 is operable to produce signals which cause the motors to cause rotation at controlled angular velocities. The control means 60 comprises a microprocessor 66 which provides control signals to the motors to cause them to operate according to a predetermined program. The control means 60 also comprises monitoring means which is operable to monitor the operation of the motors 28 and 50, the monitoring means providing feedback to the microprocessor 66 of the rotational speeds and angular positions of the motors 28 and 50. In the case of the motor 28, the monitoring means comprises a pulse counter 68 mounted on the frame 26 to detect teeth 69 formed on a portion of the outside surface of the support 20. In the case of the motor 50, the monitoring means is an angular encoder 70 associated with the motor.

The control means 60 is operable to control the speed of rotation of the motors 28 and 50 according to the predetermined program so that, in order to maintain a constant diameter for the machining circle, the support 20 and the tool holder 30 are rotated about their respective axes 22 and 32 at equal angular velocities. This causes the tool holder 30 and the support 20 to rotate as a unit, ie the gears 42, 54 and 56 rotate as a unit about the axis 22. During this movement, the gear 56 moves in a circle about the axis 22 but does not turn about its own axis. Thus, the gear 56 retains the same point of contact with both the gear 54 and the gear 42.

The control means 60 is also operable to control the speed of rotation of the motors 28 and 50 so that, in order to adjust the diameter of the machining circle, the motor 50 operates for a period at a different angular velocity to the motor 28, thereby altering the position of the tool holder 30 relative to the support 20 about the axis 32. This, because of the off-set of the axis 32 from the axis 22, alters the distance of the tool 48 from the axis 22. The same effect could be achieved by instead operating the motor 28 for a period at a different angular velocity.

Alteration of the angular velocity of the motor 50, without alteration of the angular velocity of the motor 28, causes the gear 56 to turn about its axis and to turn the gear 42 about the axis 42. This alters the position of the tool holder 30 relative to the support 20. A turn of the tool holder 30 through 360° relative to the support 20 would alter the diameter of the machining circle in a quasi-sinusoidal manner with an amplitude of 5 mm (twice the off-set of the axes 22 and 32).

The control means 60 also controls the movement of the frame 26 along the aforementioned slideway 27 and receives feedback of this position from a linear encoder 72 which is mounted between the slideway 27 and a bracket 74 which projects from the frame 26.

In the operation of the machine tool 10 to machine the surface 12 of the bore 14, the piston in which the bore 14 is formed is mounted with the axis 18 of the bore 14 aligned with the machining axis 22 of the machine tool 10. With the cutting tool 48 at the correct distance from the machining axis 22 for machining the portion of the surface 12 away from the recess 18, ie with the tool 48 at an intermediate distance from the axis 22, the motors 28 and 50 are operated at an equal angular velocity, eg 6000 RPM, so that the support 20 and the tool holder 30 rotate as a unit about the machining axis 22. Next, the ball screw 29 is operated to move the frame 26 along the slideway 27, thereby moving the tool 48 into the bore 14 so that the tool 48 machines the surface 12 to a constant diameter.

When the tool 48 reaches the location of the recess 16 of the bore 14, the motor 50 is briefly slowed relative to the speed of the motor 28 before returning to an equal angular velocity to that of the motor 28. This causes the tool holder 30 to turn relative to the support 20 about the axis 32. The tool holder 30 turns through, eg, approximately 90 degrees relative to the support 20. Because of the off-set of the axes 22 and 32, the turning of the tool holder 30 moves the tool 48 away from the axis 22 so that the tool 48 enters the recess 16. When the recess 16 has been machined, the motor 50 is speeded up briefly relative to the speed of the motor 28 before returning to an equal angular velocity. This causes the tool holder 30 to turn in the opposite sense relative to the support 20 about the axis 32, thereby returning to its original orientation relative to the support 20. This causes the tool 48 to leave the recess 16 so that the remainder of the bore 14 can be machined to the same constant diameter referred to above.

When the machining of the bore 14 has been completed, the motor 50 is again speeded up relative to the speed of the motor 28 before returning to an equal angular velocity. This moves the tool 48 to its nearest distance from the machining axis 22 so that it can pass through the bore 14 without contacting the surface 12. The ball screw 29 is then operated to withdraw the tool 48 from the bore 14.

It is apparent that, in the machine tool 10, the diameter of the machining circle is adjusted without moving the cutting tool 48 relative to the tool holder 30.

In modifications of the illustrative machine tool, the gears 42, 54, and 56 can be replaced by a cam arrangement. It is also possible, for compactness, to mount the motor 50 within the support 20.

What is claimed is:

1. A machine tool suitable for use in machining a surface of a bore by moving a cutting tool around a machining circle which has an adjustable diameter, the machine tool comprising a support mounted for rotation about a machining axis, and a first motor operable to rotate the support about the machining axis, wherein the machine tool also comprises a tool holder mounted on the support for rotation about a tool positioning axis which is parallel to and off-set from the machining axis, the tool holder being adapted to receive a tool carrier on which a cutting tool is mounted, a second motor operable to rotate the tool holder about the tool positioning axis, and control means operable to control the speed of rotation of the first and the second motors according to a predetermined program so that, in order to maintain a constant diameter for the machining circle, the support and the tool holder are rotated about their respective axes at equal angular velocities so that the tool holder and the support rotate as a unit, and, in order to adjust the diameter of the machining circle, one of the motors operates for a period at a different angular velocity to the other motor, thereby altering the position of the tool holder relative to the support about the tool positioning axis and altering the distance of the cutting tool mounted on the tool holder from the machining axis.

2. A machine according to claim 1, wherein said tool positioning axis is off-set from said machining axis by between 0.1 mm and 5 mm.

3. A machine tool according to claim 1, wherein said second motor drives a hollow cylindrical gear which is provided with internal teeth, the cylindrical gear driving an idler gear which is mounted for rotation on said support, and the idler gear driving a gear which is fixedly mounted on said tool holder.

* * * * *